US012571720B2

(12) United States Patent
Box

(10) Patent No.: US 12,571,720 B2
(45) Date of Patent: Mar. 10, 2026

(54) APPARATUS FOR AND METHOD OF DETERMINING DRYNESS LEVEL OF STEAM

(71) Applicant: T. J. B. Systems Ltd, London (GB)

(72) Inventor: Timothy John Box, London (GB)

(73) Assignee: T.J.B. SYSTEMS LTD, London (GB)

( * ) Notice: Subject to any disclaimer, the term of this patent is extended or adjusted under 35 U.S.C. 154(b) by 334 days.

(21) Appl. No.: 18/099,326

(22) Filed: Jan. 20, 2023

(65) Prior Publication Data

US 2023/0236110 A1     Jul. 27, 2023

(30) Foreign Application Priority Data

Jan. 21, 2022    (GB) ...................................... 2200796

(51) Int. Cl.
*G01N 19/10*            (2006.01)

(52) U.S. Cl.
CPC .................................... *G01N 19/10* (2013.01)

(58) Field of Classification Search
CPC ........ G01N 19/10; G01N 25/60; G01N 33/00; G01F 1/76; F22B 35/16
See application file for complete search history.

(56) References Cited

U.S. PATENT DOCUMENTS 4,576,036 A * 3/1986 Huang ....................... G01F 1/74
                                                      73/861.58
4,769,593 A 9/1988 Reed et al.

4,849,687 A 7/1989 Sims et al.
2011/0000281 A1 * 1/2011 Deacon ................... G01N 25/60
                                                      73/25.04
2014/0250979 A1 * 9/2014 Van Vyve .............. G01N 25/56
                                                      73/29.02

FOREIGN PATENT DOCUMENTS

GB          2211619          7/1989

* cited by examiner

*Primary Examiner* — Timothy P Graves
(74) *Attorney, Agent, or Firm* — Terry M. Sanks, Esq.; Beusse Sanks, PLLC

(57)                    ABSTRACT

There is provided an apparatus (20), for determining a dryness level of steam from a steam source (22), comprising:
  a flow measurement device (24) for measuring a flow of the steam from the steam source (22);
  a condenser (26) for producing condensate from the steam from the steam source (22); and
  a condensate sensing device (30) configured to:
    measure a collection value of condensate produced from the steam from the steam source (22);
    obtain a mass flow rate from the measured flow of the steam from the steam source (22);
    use the obtained mass flow rate to determine an expected collection value of condensate produced from steam of a known dryness level, or use the obtained mass flow rate to determine an expected collection value of steam from the steam source based on a known dryness level;
    determine a dryness level of the steam from the steam source (22) by comparing the measured collection value and the expected collection value.

20 Claims, 4 Drawing Sheets

APPARATUS FOR AND METHOD OF DETERMINING DRYNESS LEVEL OF STEAM

The invention relates to an apparatus for and a method of determining a dryness level of steam from a steam source.

Steam is used in numerous industries. For example, the health and pharmaceutical industries are required to conduct steam quality tests to meet certain regulatory requirements, while industrial systems use steam to operate various industrial equipment and processes. Since steam quality can affect equipment performance and longevity, it is desirable to monitor steam quality including dryness level, non-condensable gas content and superheat value. Conventional ways of monitoring steam quality include use of a throttling calorimeter, a separating calorimeter and a thermometric/volumetric method.

According to a first aspect of the invention, there is provided an apparatus, for determining a dryness level of steam from a steam source, comprising:

a flow measurement device for measuring a flow of the steam from the steam source;

a condenser for producing condensate from the steam from the steam source and;

a condensate sensing device configured to:

measure a collection value of condensate produced from the steam from the steam source;

obtain a mass flow rate from the measured flow of the steam from the steam source;

use the obtained mass flow rate to determine (e.g. calculate) an expected collection value of condensate produced from steam of a known dryness level (e.g. fully dry steam), or use the obtained mass flow rate to determine (e.g. calculate) an expected collection value of steam from the steam source based on a known dryness level (e.g. fully dry steam);

determine (e.g. calculate) a dryness level of the steam from the steam source by comparing the measured collection value and the expected collection value.

The term "fully dry steam" refers to steam comprised of only water vapour and no suspended water droplets. On the other hand the terms "wet steam" or "non-dry steam" refers to steam comprised of both water vapour and suspended water droplets. The dryness level of steam is typically given as a fraction to quantify the amount of water in the steam by mass. A dryness level of 1.0 indicates that the steam contains 100% water vapour by mass and 0% suspended water droplets by mass, a dryness level of 0.9 indicates that the steam contains 90% water vapour by mass and 10% suspended water droplets by mass, and so on.

In use, the apparatus of the invention is configured such that a flow of steam from a steam source is measured by the flow measurement device and is condensed by the condenser to produce condensate that can be collected. By using the condenser to produce the condensate, the condensate sensing device is able to obtain an actual measured collection value of condensate based on actual conditions of the steam.

As a result of the large difference in volume between water vapour and suspended water droplets of the same mass, the mass flow rates of the actual wet steam and the steam of a known dryness level will be virtually identical at high dryness levels; any difference between the mass flow rates will be negligible. This means that the mass flow rate of the actual wet steam can be used to, with high accuracy, obtain the expected collection value of condensate/steam based on steam of a known dryness level. However, due to the presence of suspended water droplets in the actual wet steam, the measured collection value based on the actual wet steam may be the same or different from the expected collection value based on the steam of a known dryness level. It is this similarity or difference that enables the dryness level of the actual wet steam to be determined.

The configuration of the apparatus of the invention advantageously not only enables the determination of the dryness level of the actual steam at higher sensitivities and lower energy consumption than conventional methods but also permits automated steam dryness level determination that requires minimal to no intervention by a user. The invention allows the automated steam dryness level determination to be carried out periodically, e.g. every few minutes, depending on the requirements of the system or equipment connected to the steam source.

The apparatus of the invention may be used to determine a dryness level of steam at a location that is near to or remote from the steam source. The steam may have been transported using one or more steam pipes from the steam source to the location of the apparatus of the invention. The apparatus of the invention may be configured to determine a dryness level of steam at or preceding certain locations that require a specific steam dryness level to function properly or minimise long-term damage.

The configuration of the flow measurement device may vary.

In a preferred embodiment of the invention, the flow measurement device may comprise: an orifice through which the steam from the steam source may flow; and a pressure sensing device for measuring a pressure drop across the orifice, wherein the condensate sensing device may be configured to determine (e.g. calculate) the mass flow rate from the measured pressure drop across the orifice. In such embodiments, the pressure sensing device may include first and second pressure sensors arranged to, in use, measure pressures at opposite sides of the orifice.

Configuring the flow measurement device in this manner provides a structurally simple way of measuring the flow of the steam from the steam source. The orifice may be arranged so that a portion or all of the steam from the steam source flows through the orifice. By requiring only part of the steam from the steam source to flow through the orifice, the apparatus of the invention may be designed to minimise its impact on the configuration and operation of the system or equipment connected to the steam source.

The size and shape of the orifice may vary. A circular shape of the orifice is preferred.

The orifice may form part of a tubular object (such as a pipe or tube), wherein the tubular object may be positionable in the flow of the steam from the steam source. The tubular object may be an integral part of the system or equipment connected to the steam source, or may be attachable to or insertable into the system or equipment connected to the steam source. The orifice may be arranged to be co-axial with a direction of flow of the steam from the steam source. The condenser may be operably connected to the orifice for producing condensate from the steam from the steam source that passed through the orifice.

In other embodiments of the invention, the flow measurement device may include a volumetric or mass flow meter.

The condensate sensing device may be configured to measure the collection value of condensate in a variety of ways, non-limiting examples of which are described as follows.

In embodiments of the invention, the condensate sensing device may be configured to:

measure a collection time taken to collect a fixed amount
of condensate produced from the steam from the steam
source;

use the obtained mass flow rate to determine (e.g. calcu-
late) an expected collection time to collect the same
fixed amount of condensate produced from steam of a
known dryness level, or use the obtained mass flow rate
to determine (e.g. calculate) an expected collection
time required to collect the same fixed amount of steam
from the steam source based on a known dryness level;

determine (e.g. calculate) a dryness level of the steam
from the steam source by comparing the measured
collection time and the expected collection time.

Using the measured and expected collection times as the
basis for determining the dryness level of the steam enables
the apparatus of the invention to be readily used with
different steam sources producing steam with various levels
of moisture content.

In such embodiments of the invention, the condensate
sensing device may include a timer for measuring the
collection time taken to collect the fixed amount of conden-
sate. Preferably the condensate sensing device is configured
to start the timer when a first amount of condensate is
collected and to stop the timer when a second amount of
condensate is collected, wherein the difference between the
first and second amounts of condensate corresponds to the
fixed amount of condensate. It will be appreciated that the
timer of the condensate sensing device may form part of a
controller.

In further embodiments of the invention, the condensate
sensing device may be configured to:

measure a collected amount of condensate produced from
the steam from the steam source over a fixed time
period;

use the obtained mass flow rate to determine (e.g. calcu-
late) an expected collected amount of condensate pro-
duced from steam of a known dryness level over the
same fixed time period, or use the obtained mass flow
rate to determine (e.g. calculate) an expected collected
amount of steam from the steam source based on a
known dryness level over the same fixed time period;

determine (e.g. calculate) a dryness level of the steam
from the steam source by comparing the measured
collected amount and the expected collected amount.

Using the measured and expected collected amounts over
a fixed time period as the basis for determining the dryness
level of the steam provides certainty over the time taken to
perform the steam dryness level determination, which can
then be carried out cyclically in a reliable fashion.

In still further embodiments of the invention, the conden-
sate sensing device may be configured to:

measure a rate of collecting condensate produced from the
steam from the steam source;

use the obtained mass flow rate to determine (e.g. calcu-
late) an expected rate of collecting condensate pro-
duced from steam of a known dryness level, or use the
obtained mass flow rate to determine (e.g. calculate) an
expected rate of collecting steam from the steam source
based on a known dryness level;

determine (e.g. calculate) a dryness level of the steam
from the steam source by comparing the measured rate
of collecting and the expected rate of collecting.

Using the measured and expected rates of collecting as the
basis for determining the dryness level of the steam enables
a quick determination of the dryness level of the steam,
which may be useful in certain industries requiring shorter
measurement times or quicker response times.

The condensate sensing device may be configured to
measure a collected volume of condensate produced from
the steam from the steam source. In this case the condensate
sensing device may include, but is not limited to, at least one
float level switch, at least one contact sensor and/or at least
one optical sensor.

The condensate sensing device may be configured to
measure a collected mass of condensate produced from the
steam from the steam source. In this case the condensate
sensing device may include, but is not limited to, a mass or
weight scale.

The condensate sensing device may include a collector
configured to, in use, collect the condensate.

The condensate sensing device may include a liquid flow
meter configured to, in use, collect the condensate and
measure a flow rate of the collected condensate.

The collector may include a vessel configured to, in use,
collect the condensate.

The aforementioned various ways of measuring the col-
lection value of condensate enables high-sensitivity mea-
surement of the collection of condensate, which in turn
enables a more accurate determination of the dryness level
of the steam even when there are only very low amounts of
water in the steam.

The apparatus of the invention may include a valve
controllable to selectively drain condensate from the vessel.
The valve may be, but is not limited to, a solenoid valve.
This enables the vessel to be emptied so that the apparatus
of the invention can be used for multiple measurements.

In such embodiments, the apparatus may include a con-
troller configured to control the valve to selectively drain
condensate from the vessel. Preferably the controller is
configured to control the valve to drain condensate from the
vessel at regular time intervals. Alternatively the controller
may be configured to control the valve to drain condensate
from the vessel after the dryness level of the steam from the
steam source is determined. Such control over the valve
enables automatic draining of the condensate from the
vessel, thus removing the need for constant monitoring by a
user.

In embodiments of the invention, the apparatus may
include a non-condensable gas sensing device for monitor-
ing a flow of condensate from the condenser. The non-
condensable gas sensing device may be configured to detect
the presence of a non-condensable gas bubble in the flow of
condensate from the condenser. The non-condensable gas
sensing device may be configured to use the obtained mass
flow rate in combination with the detection of the presence
of the non-condensable gas bubble in the flow of condensate
from the condenser so as to determine (e.g. calculate) an
amount of non-condensable gas in the steam from the steam
source. This further enhances the steam quality assessment
capabilities of the apparatus of the invention by enabling
measurement of the amount of non-condensable gas in the
steam from the steam source, without requiring the addition
of a significant amount of additional sensing hardware.
Optionally the non-condensable gas sensing device may be
configured for monitoring the flow of condensate between
the condenser and the collector.

In such embodiments, the non-condensable gas sensing
device may include a timer. The non-condensable gas sens-
ing device may be configured to start the timer when the
presence of the non-condensable gas bubble is first detected
and to stop the timer when the presence of the non-con-
densable gas bubble is no longer detected. The non-con-
densable gas sensing device may be configured to use the
obtained mass flow rate in combination with a time duration of detection of the presence of the non-condensable gas bubble in the flow of condensate from the condenser so as to determine (e.g. calculate) an amount of non-condensable gas in the steam from the steam source. It will be appreciated that the timer of the non-condensable gas sensing device may form part of a controller.

Optionally the non-condensable gas sensing device may include an optical sensor, such as an optoelectronic sensor.

In further embodiments of the invention, the apparatus may include a temperature sensor for measuring the temperature of the steam from the steam source. The temperature sensor may be configured to use the measured temperature to determine (e.g. calculate) a superheat value of the steam and to determine (e.g. calculate) a dryness level of the steam. In such embodiments when the orifice is employed in the invention, the temperature sensor may be configured to measure the temperature of the steam from the steam source that passed through the orifice. This further enhances the steam quality assessment capabilities of the apparatus of the invention by not only enabling measurement of the superheat value of the steam but also providing a way of validating the dryness level determined by the controller. The validation may be carried out automatically by the controller or manually by a user.

In still further embodiments of the invention, the apparatus may include an indication device configured to provide an indicator when the determined dryness level of the steam from the steam source is identified as exceeding a predefined dryness threshold. The indicator may come in a variety of forms. The indicator may be an information, error, alarm or control signal. The indicator may be an electronic, aural, visual, actual or virtual signal. The indicator enables corrective or protective action to be taken, either manually by a user or automatically by a controller or another system, in order to ensure that the steam source or any associated system or equipment is functioning properly.

According to a second aspect of the invention, there is provided a method of determining a dryness level of steam from a steam source, the method comprising the steps of:
measuring a flow of the steam from the steam source;
producing condensate from the steam from the steam source;
measuring a collection value of condensate produced from the steam from the steam source;
obtaining a mass flow rate from the measured flow of the steam from the steam source;
using the obtained mass flow rate to determine (e.g. calculate) an expected collection value of condensate produced from steam of a known dryness level, or using the obtained mass flow rate to determine (e.g. calculate) an expected collection value of steam from the steam source based on a known dryness level;
determining (e.g. calculating) a dryness level of the steam from the steam source by comparing the measured collection value and the expected collection value.

The features and advantages of the apparatus of the first aspect of the invention and its embodiments apply mutatis mutandis to the method of the second aspect of the invention and its embodiments.

The method of the invention may include the steps of:
providing an orifice through which the steam from the steam source may flow;
measuring a pressure drop across the orifice;
determining (e.g. calculating) the mass flow rate from the measured pressure drop across the orifice.

The method of the invention may include the step of measuring pressures at both sides of the orifice.

The method of the invention may include the steps of:
measuring a collection time taken to collect a fixed amount of condensate produced from the steam from the steam source;
using the obtained mass flow rate to determine (e.g. calculate) an expected collection time required to collect the same fixed amount of condensate produced from steam of a known dryness level, or using the obtained mass flow rate to determine (e.g. calculate) an expected collection time required to collect the same fixed amount of steam from the steam source based on a known dryness level;
determining (e.g. calculating) a dryness level of the steam from the steam source by comparing the measured collection time and the expected collection time.

In such embodiments, the method of the invention may include the steps of:
providing a timer for measuring the collection time taken to collect the fixed amount of condensate;
starting the timer when a first amount of condensate is collected;
stopping the timer when a second amount of condensate is collected, wherein the difference between the first and second amounts of condensate corresponds to the fixed amount of condensate.

The method of the invention may include the steps of:
measuring a collected amount of condensate produced from the steam from the steam source over a fixed time period;
using the obtained mass flow rate to determine (e.g. calculate) an expected collected amount of condensate produced from steam of a known dryness level over the same fixed time period, or using the obtained mass flow rate to determine (e.g. calculate) an expected collected amount of steam from the steam source based on a known dryness level over the same fixed time period;
determining (e.g. calculating) a dryness level of the steam from the steam source by comparing the measured collected amount and the expected collected amount.

The method of the invention may include the steps of:
measuring a rate of collecting condensate produced from the steam from the steam source;
using the obtained mass flow rate to determine (e.g. calculate) a rate of collecting condensate produced from steam of a known dryness level, or using the obtained mass flow rate to determine (e.g. calculate) an expected rate of collecting steam from the steam source based on a known dryness level;
determining a dryness level of the steam from the steam source by comparing the measured rate of collecting and the expected rate of collecting.

The method of the invention may include the step of measuring a collected volume of condensate produced from the steam from the steam source. Preferably the measurement of the collected volume of condensate is carried out using at least one float level switch and/or at least one optical sensor.

The method of the invention may include the step of measuring a collected mass of condensate produced from steam from the steam source. Preferably the measurement of the collected mass of condensate is carried out using a mass or weight scale.

The method of the invention may include the steps of collecting the condensate and measuring a collection of condensate using a liquid flow meter when the condensate is produced from steam from the steam source.

The method of the invention may include the steps of collecting the condensate in a vessel.

The method of the invention may include the step of providing a valve controllable to selectively drain condensate from the vessel.

The method of the invention may include the step of controlling the valve to drain condensate from the vessel at regular time intervals.

The method of the invention may include the steps of:

monitoring a flow of the produced condensate;

detecting the presence of a non-condensable gas bubble in the flow of the produced condensate;

using the obtained mass flow rate in combination with the detection of the presence of the non-condensable gas bubble in the flow of condensate from the condenser so as to determine (e.g. calculate) an amount of non-condensable gas in the steam from the steam source.

In such embodiments, the method of the invention may include the steps of:

providing a timer;

starting the timer when the presence of the non-condensable gas bubble is first detected;

stopping the timer when the presence of the non-condensable gas bubble is no longer detected;

using the obtained mass flow rate in combination with a time duration of detection of the presence of the non-condensable gas bubble in the flow of condensate from the condenser so as to determine (e.g. calculate) an amount of non-condensable gas in the steam from the steam source.

In further such embodiments, the detection of the presence of the non-condensable gas bubble may be carried out using an optical sensor.

The method of the invention may include the steps of:

measuring the temperature of the steam from the steam source;

using the measured temperature to determine a superheat value of the steam and to determine (e.g. calculate) a dryness level of the steam.

In such embodiments, the method of the invention may include the step of measuring the temperature of the steam from the steam source that passed through the orifice.

The method of the invention may include the step of providing an indicator when the determined dryness level of the steam from the steam source is identified as exceeding a predefined dryness threshold.

Preferred embodiments of the invention will now be described, by way of non-limiting examples, with reference to the accompanying drawings in which.

The figures are not necessarily to scale, and certain features and certain views of the figures may be shown exaggerated in scale or in schematic form in the interests of clarity and conciseness.

Steam quality can be affected by several factors, such as the dryness level of the steam, the amount of non-condensable gas (NCG) in the steam and the level of superheat in the steam.

Figure 1:
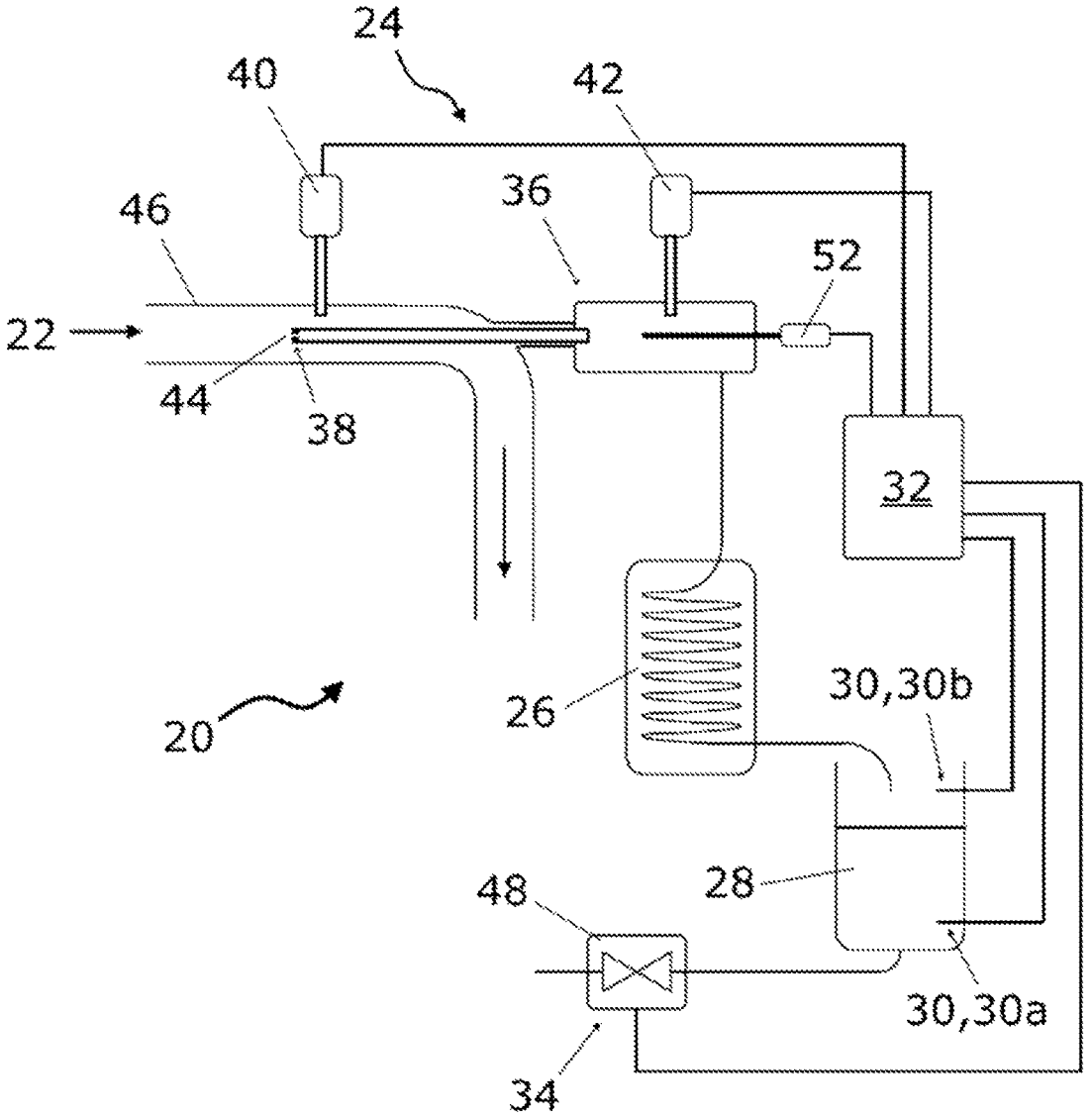
FIG. 1 shows an apparatus according to a first embodiment of the invention.

An apparatus according to a first embodiment of the invention is shown in FIG. 1 and is designated generally by the reference numeral 20. The apparatus 20 is for determining a dryness level of steam from a steam source 22. The arrow pointing away from the steam source 22 shows the direction of steam flow.

The apparatus 20 comprises a flow measurement device 24, a condenser 26, a vessel 28, a condensate sensing device 30, a controller 32 and a drainage device 34.

The flow measurement device 24 is for measuring a flow of a sample of the steam from the steam source 22. In particular, the flow measurement device 24 comprises a pipe 36, an orifice plate 38 and first and second pressure sensors 40,42. The orifice plate 38 is mounted inside the inlet of the pipe 36. The orifice plate 38 includes a circular orifice 44. Other shapes and sizes of the orifice are envisaged.

In use, the inlet of the pipe 36 is exposed to a flow of steam from the steam source 22. This may be carried out by inserting the inlet of the pipe 36 into a steam pipe 46 connected to the steam source 22. A portion of the steam flows into the inlet of the pipe 36 and thereby flows through the orifice 44 in the orifice plate 38, which creates a pressure drop across the orifice 44. Preferably the orifice 44 is arranged to be co-axial with a direction of flow of the steam from the steam source 22.

The first pressure sensor 40 is positioned to measure a pressure on one side of the orifice 44 while the second pressure sensor 42 is positioned to measure a pressure on an opposite side of the orifice 44. In the embodiment shown, the first pressure sensor 40 is installed in the steam pipe 46 connected to the steam source 22 while the second pressure sensor 42 is installed in the pipe 36. In other embodiments of the invention, both the first and second pressure sensors 40,42 may be installed in different ways so long as the first and second pressure sensors 40,42 are positioned to measure pressures on opposite sides of the orifice 44. Each of the first and second pressure sensors 40,42 provide output pressure measurements to the controller 32.

An outlet of the pipe 36 is connected via a fluid conduit (such as pipework or tubing) to an inlet of the condenser 26 so that the steam flowing through the orifice 44 flows into the condenser 26. In use, the condenser 26 produces condensate from the water vapour and any suspended water particles in the steam. The production of the condensate can be carried out by cooling the steam or by increasing the pressure of the steam. The condenser 26 may be actively cooled or passively cooled.

An outlet of the condenser 26 is connected via a fluid conduit (such as pipework or tubing) to an inlet of the vessel 28 that is a container shaped to collect the incoming condensate.

The condensate sensing device 30 comprises first and second volume sensors and a timer. At least part of the controller 32 is comprised in the condensate sensing device 30 in order for the condensate sensing device 30 to perform its function. The timer of the condensate sensing device may form part of the controller 32. The volume sensors are in the form of probes 30a,30b with sensing ends that are positioned at different heights inside the vessel 28. Since the height difference between the sensing ends of the probes 30a,30b is fixed, the volume between the sensing ends of the probes 30a, 30b is also fixed based on the dimensions of the vessel 28 and the height difference between the sensing ends. Each of the volume sensors provide output volume measurements to the controller 32. The probes 30a, 30b may be replaced by other types of volume sensors such as at least one float level switch, at least one contact sensor and/or at least one optical sensor.

The drainage device 34 includes a solenoid valve 48 that is automatically controlled by the controller 32 to selectively drain condensate from the vessel 28. Other types of valves may be used in place of the solenoid valve 48.

Initially the solenoid valve 48 is opened to drain condensate from the vessel 28. Once the lower first probe 30a no longer detects the condensate because the level of the condensate has dropped below its sensing end, the solenoid valve 48 is closed to stop draining condensate from the vessel 28.

As the condensate begins to fill the vessel 28, the lower first probe 30a detects the condensate when the level of the condensate reaches its sensing end, and the timer is started. As the condensate continues to fill the vessel 28, the higher second probe 30b detects the condensate when the level of the condensate reaches its sensing end, and the timer is stopped. In this way the condensate sensing device 30 is configured to measure a collection time taken to collect a fixed volume of condensate in the vessel 28, where the collection time is the time it takes for the condensate to fill the vessel from the height of the first probe's sensing end to the height of the second probe's sensing end.

The controller 32 calculates a mass flow rate from the measured pressure drop across the orifice 44, and uses the calculated mass flow rate to calculate an expected collection time required to collect the same fixed volume of condensate in the vessel 28 when the condensate is produced from fully dry steam. Alternatively the expected collection time may be determined by using the calculated mass flow rate with reference to a look-up table for fully dry steam. By comparing the measured collection time and the expected collection time, the controller 32 is able to determine how much suspended water particles by mass was present in the steam and thereby is able to determine a dryness level of the steam from the steam source 22. If the steam contained no suspended water droplets, then the measured collection time will be the same as the expected collection time. If the steam contained suspended water droplets, then condensate will accumulate quicker in the vessel 28, which means that the measured collection time will be shorter than the expected collection time.

The controller 32 may include, or may be connected to, a display for providing a readout of the dryness level of the steam. The readout may be provided in real-time or stored for display at a later time. The readout may be provided constantly or periodically.

Alternatively the condensate sensing device 30 may be configured to measure a collected volume of condensate in the vessel 28 over a fixed time period. This may be carried out by using the timer to record the fixed time period and by using the volume sensors to measure how much condensate is collected in the vessel 28 over the fixed time period. The controller 32 uses the calculated mass flow rate to calculate an expected collected volume of condensate in the vessel 28 over the same fixed time period when the condensate is produced from fully dry steam. Alternatively the expected collected volume of condensate may be determined by using the calculated mass flow rate with reference to a look-up table for fully dry steam. By comparing the measured collected volume and the expected collected volume, the controller 32 is able to determine how much suspended water particles by mass was present in the steam and thereby is able to determine a dryness level of the steam from the steam source 22. If the steam contained no suspended water droplets, then the measured collected volume will be the same as the expected collected volume. If the steam contained suspended water droplets, then condensate will accumulate quicker in the vessel 28, which means that the measured collected volume will be higher than the expected collected volume.

Further alternatively the condensate sensing device 30 may be configured to measure a rate of collecting condensate in the vessel 28. This may be carried out by using the timer to record a time period, by using the volume sensors to measure how much condensate is collected in the vessel 28 over the time period and by using the controller to calculate the rate of collecting condensate in the vessel 28 from the recorded time period and the measured collected volume. The controller 32 uses the calculated mass flow rate to calculate an expected rate of collecting condensate in the vessel 28 when the condensate is produced from fully dry steam. Alternatively the expected rate of collecting condensate may be determined by using the calculated mass flow rate with reference to a look-up table for fully dry steam. By comparing the measured rate of collecting condensate in the vessel 28 and the expected rate of collecting condensate in the vessel 28, the controller 32 is able to determine how much suspended water particles by mass was present in the steam and thereby is able to determine a dryness level of the steam from the steam source 22. If the steam contained no suspended water droplets, then the measured rate of collecting condensate will be the same as the expected rate of collecting condensate. If the steam contained suspended water droplets, then condensate will accumulate quicker in the vessel 28, which means that the rate of collecting condensate in the vessel 28 will be higher than the expected rate of collecting condensate in the vessel 28.

Instead of measuring the volume of condensate collected in the vessel 28, the condensate sensing device 30 may be configured to measure a collected mass of the condensate in the vessel 28. This may be carried out by, for example, configuring the condensate sensing device to include a mass or weight scale. In this regard, the expected collection time, the expected collected mass or the expected rate of collecting may be calculated by the controller 32 with reference to collection of a mass of steam from the steam source based on the assumption that the steam is fully dry steam.

The foregoing references to fully dry steam may be replaced by a steam of a different known dryness level.

The apparatus 20 further comprises an optional temperature sensor 52 for measuring the temperature of the steam at the lower pressure side of the orifice 44. The temperature sensor 52 provides an output temperature measurement to the controller 32, which uses the measured temperature to determine a superheat value of the steam. At least part of the controller 32 is comprised in the temperature sensor 52 in order for the temperature sensor 52 to perform its function.

In addition, since the superheat value is related to the dryness level of the steam at high dryness levels of the steam, the controller 22 can use the superheat value to validate the dryness level of the steam that is determined by the controller 32 as described above, especially at a dryness level in the range of 0.98 to 1.0.

Figure 2:
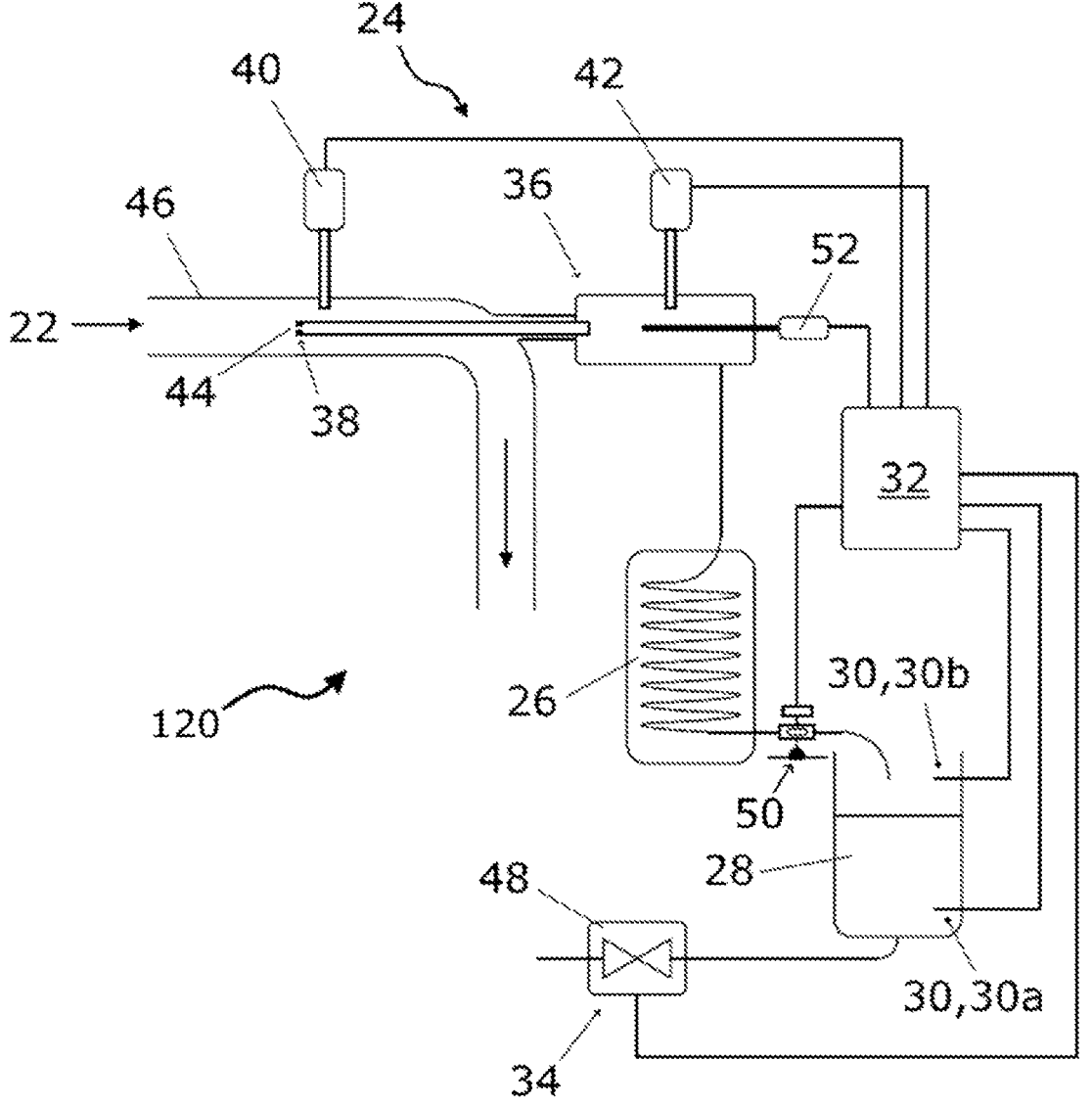
FIG. 2 shows an apparatus according to a second embodiment of the invention.

An apparatus according to a second embodiment of the invention is shown in FIG. 2 and is designated generally by the reference numeral 120. The apparatus 120 of FIG. 2 is similar in structure and operation to the apparatus 20 of FIG. 1, and like features share the same reference numerals.

The apparatus 120 of FIG. 2 differs from the apparatus 20 of FIG. 1 in that the apparatus 120 of FIG. 2 further comprises a non-condensable gas sensing device 50 for monitoring a flow of condensate in the fluid conduit interconnecting the condenser 26 and the vessel 32. The non-condensable gas sensing device 50 includes an optical sensor and a timer. At least part of the controller 32 is comprised in the non-condensable gas sensing device 50 in order for the non-condensable gas sensing device 50 to perform its function. The timer of the non-condensable gas sensing device 50 may form part of the controller 32.

In use, the optical sensor (e.g. an optoelectronic sensor) is configured to detect the presence of a non-condensable gas bubble in the fluid conduit interconnecting the condenser 26 and the vessel 32 by transmitting light (e.g. infrared light) through a window on one side of the fluid conduit and monitoring the light from the other side of the fluid conduit. When the non-condensable gas bubble passes the optical sensor, a change in light level can be detected by, e.g., an analogue-to-digital converter. The timer is started when the presence of the non-condensable gas bubble is first detected by the optical sensor. The timer is stopped when the presence of the non-condensable gas bubble is no longer detected by the optical sensor. In this way, it is possible to obtain the time duration of detection of the presence of the non-condensable gas bubble in the fluid conduit interconnecting the condenser 26 and the vessel 32.

Other types of sensors can be used to detect the presence of a non-condensable gas bubble in the fluid conduit interconnecting the condenser 26 and the vessel 32.

The controller 32 uses the calculated mass flow rate of the steam to obtain a mass flow rate of the condensate, which is used in combination with the time duration of detection of the presence of the non-condensable gas bubble to calculate a volume of the non-condensable gas bubble. The calculated volume of the non-condensable gas bubble can be compared against the fixed volume of condensate in the vessel 2 to determine the fraction of non-condensable gas in the steam. If necessary, the calculated volume of the non-condensable gas bubble can be extrapolated based on the collection time taken to collect the fixed volume of condensate in the vessel 28 before compared against the fixed volume of condensate in the vessel 28.

The controller 32 may include, or may be connected to, a display for providing a readout of the amount of non-condensable gas in the steam. The readout may be provided in real-time or stored for display at a later time. The readout may be provided constantly or periodically.

Figure 3:
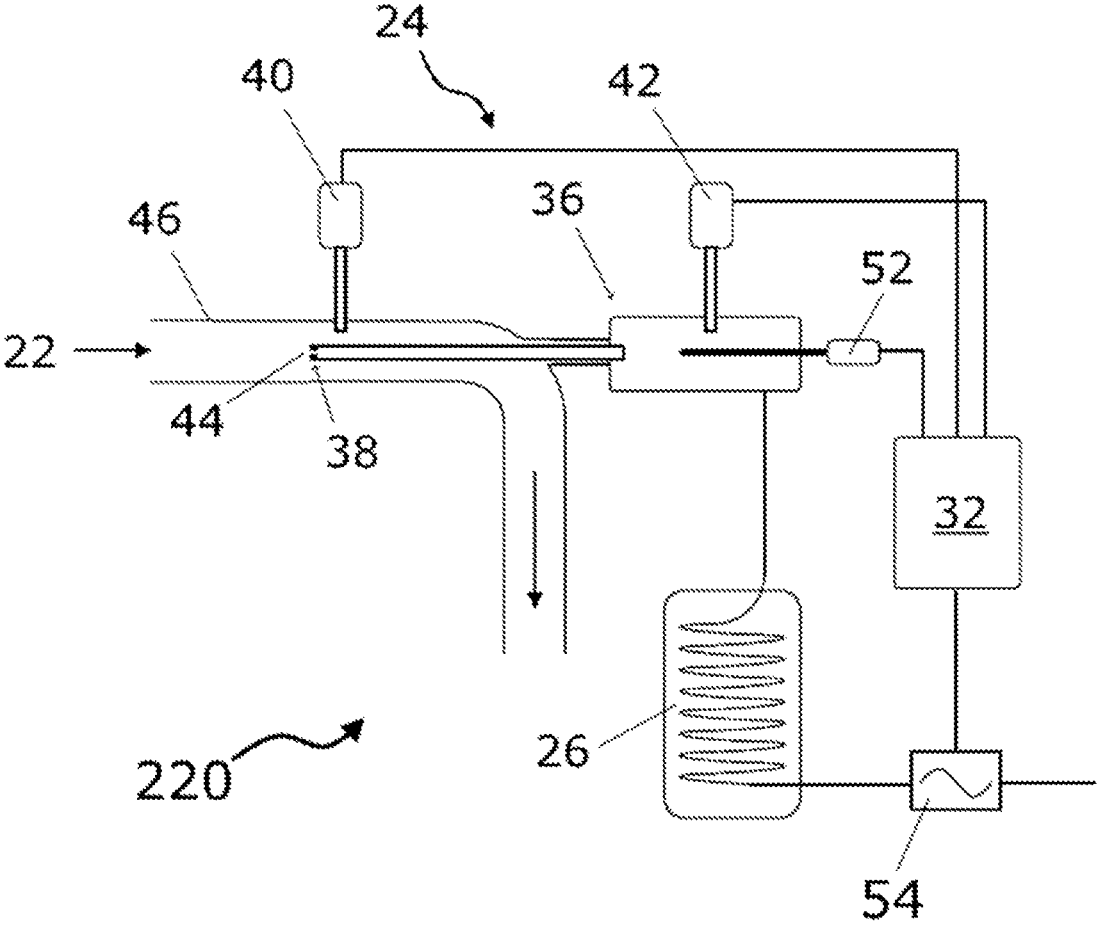
FIG. 3 shows an apparatus according to a third embodiment of the invention.

An apparatus according to a third embodiment of the invention is shown in FIG. 3 and is designated generally by the reference numeral 220. The apparatus 220 of FIG. 3 is similar in structure and operation to the apparatus 20 of FIG. 1, and like features share the same reference numerals.

The apparatus 220 of FIG. 3 differs from the apparatus 20 of FIG. 1 in that, in the apparatus 220 of FIG. 3, the vessel 28 is replaced by a liquid flow meter 54 that collects the condensate from the condenser 26 and is capable of measuring a volumetric flow rate of the collected condensate.

The collected volume of condensate by the liquid flow meter 54 can be measured by collecting the condensate for a fixed time period and then calculating the collected volume of condensate by multiplying the measured volumetric flow rate with the fixed time period. This may be carried out by using the timer to record the fixed time period. The controller 32 uses the calculated mass flow rate to calculate a collected volume of condensate by the liquid flow meter 54 over the same fixed time period when the condensate is produced from fully dry steam. Alternatively the collected volume of condensate may be determined by using the calculated mass flow rate with reference to a look-up table for fully dry steam. By comparing the measured collected volume and the calculated collected volume, the controller 32 is able to determine how much suspended water particles by mass was present in the steam and thereby is able to determine a dryness level of the steam from the steam source 22. If the steam contained no suspended water droplets, then the measured collected volume will be the same as the calculated collected volume. If the steam contained suspended water droplets, then condensate will accumulate quicker in the liquid flow meter 54, which means that the measured collected volume will be higher than the calculated collected volume.

Figure 4:
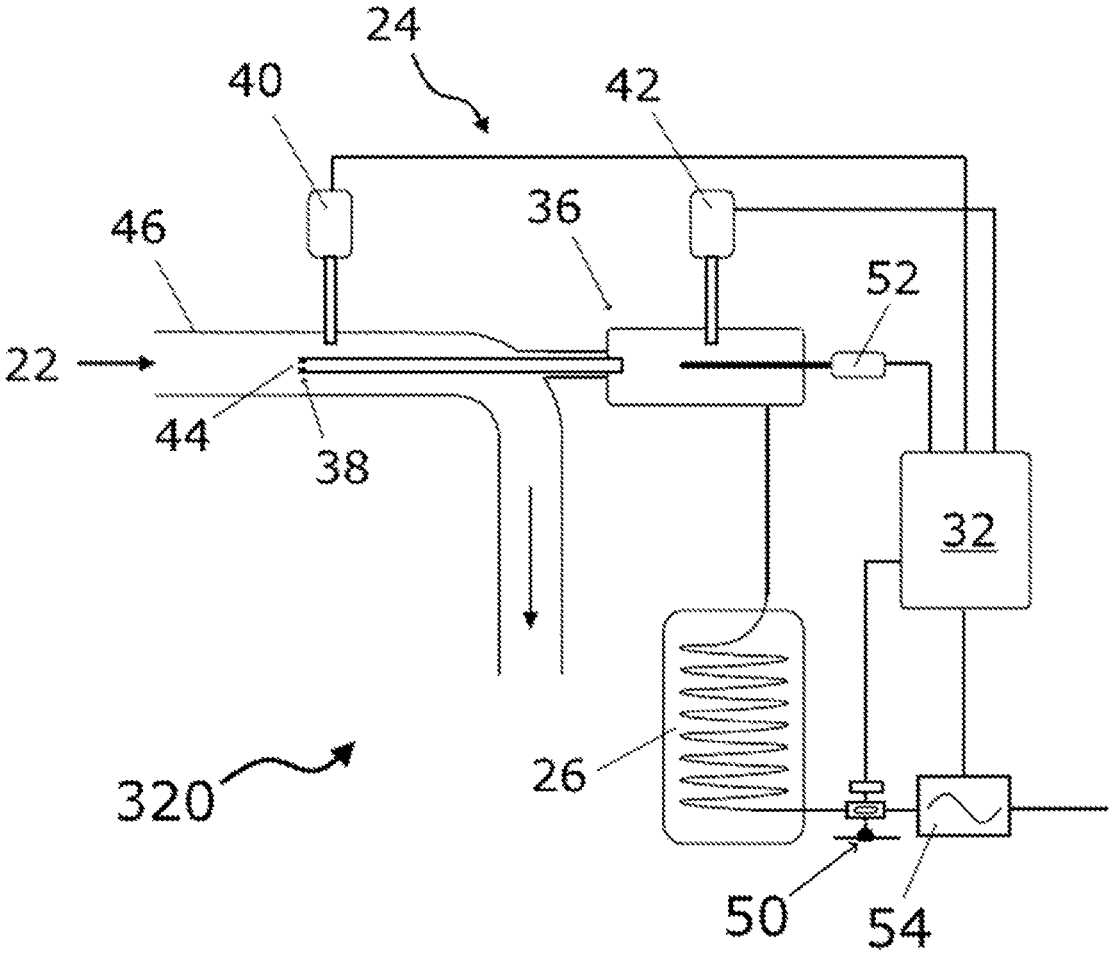
FIG. 4 shows an apparatus according to a fourth embodiment of the invention.

An apparatus according to a fourth embodiment of the invention is shown in FIG. 4 and is designated generally by the reference numeral 320. The apparatus 320 of FIG. 4 is similar in structure and operation to the apparatus 120 of FIG. 2, and like features share the same reference numerals.

The apparatus 320 of FIG. 4 differs from the apparatus 120 of FIG. 2 in that, in the apparatus 320 of FIG. 4, the vessel 28 is replaced by a liquid flow meter 54 that collects the condensate from the condenser 26 and is capable of measuring a volumetric flow rate of the collected condensate. The liquid flow meter 54 of FIG. 4 is similar in structure and operation to the liquid flow meter 54 of FIG. 3.

In each of the foregoing embodiments, the apparatus 20, 120, 220, 330 may include an indication device that is configured to provide an indicator when the determined dryness level of the steam from the steam source 22 is identified as exceeding a predefined dryness threshold. The predefined dryness threshold may be indicative of malfunction or an increased risk of damage to the steam source 22 or the steam pipe 46 connected to the steam source 22. The predefined dryness threshold may be set by the individual user or may be defined by the manufacturer of the steam source 22 or the steam pipe 46 connected to the steam source 22. The indicator may be an error or alarm signal to request a manual corrective or protective action by a user or to trigger an automatic corrective or protective action by the controller 32 or another system. Similarly, the indication device may provide an indicator when the identified amount of non-condensable gas in the steam or the superheat value of the steam is identified as exceeding a predefined amount of non-condensable gas threshold or a predefined superheat value threshold.

In embodiments of the invention, the controller 32 may include a processor and memory including computer program code. The memory and computer program code are configured to, with the processor, enable the controller 32 to carry out various processing functions. In other embodiments, the controller 32 may be, may include or may form part of one or more of an electronic device, a portable electronic device, a portable telecommunications device, a mobile phone, a personal digital assistant, a tablet, a phablet, a laptop computer, a server, a cloud computing network, a smartphone, a smartwatch, smart eyewear, and a module for one or more of the same. It will be appreciated that references to a memory or a processor may encompass a plurality of memories or processors.

It will be appreciated that any aforementioned numerical value is merely intended to help illustrate the working of the invention and may vary depending on the requirements of the invention.

The listing or discussion of an apparently prior published document or apparently prior published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An apparatus, for determining a dryness level of steam from a steam source, comprising:
a flow measurement device for measuring a flow of the steam from the steam source;
a condenser for producing condensate from the steam from the steam source; and
a condensate sensing device configured to:
measure a collection value of condensate produced from the steam from the steam source;
obtain a mass flow rate from the measured flow of the steam from the steam source;
use the obtained mass flow rate to determine an expected collection value of condensate produced from steam of a known dryness level, or use the obtained mass flow rate to determine an expected collection value of steam from the steam source based on a known dryness level; and
determine a dryness level of the steam from the steam source by comparing a difference between the measured collection value based on the actual measured steam and the expected collection value based on the steam of a known dryness level and thereby determining how much suspended water particles by mass was present in the steam, wherein the measured and expected collection values are the same type of value.

2. An apparatus according to claim 1 wherein the flow measurement device comprises: an orifice through which the steam from the steam source may flow; and a pressure sensing device for measuring a pressure drop across the orifice, wherein the condensate sensing device is configured to determine the mass flow rate from the measured pressure drop across the orifice.

3. An apparatus according to claim 2 wherein the pressure sensing device includes first and second pressure sensors arranged to, in use, measure pressures at opposite sides of the orifice.

4. An apparatus according to claim 2 wherein the orifice forms part of a tubular object, wherein the tubular object is positionable in the flow of the steam from the steam source.

5. An apparatus according to claim 2 wherein the orifice is arranged to be co-axial with a direction of flow of the steam from the steam source.

6. An apparatus according to claim 2 wherein the condenser is operably connected to the orifice for producing condensate from the steam from the steam source that passed through the orifice.

7. An apparatus according to claim 1 wherein the condensate sensing device is configured to:
measure a collection time taken to collect a fixed amount of condensate produced from the steam from the steam source;
use the obtained mass flow rate to determine an expected collection time required to collect the same fixed amount of condensate produced from steam of a known dryness level, or use the obtained mass flow rate to determine an expected collection time required to collect the same fixed amount of steam from the steam source based on a known dryness level;
determine a dryness level of the steam from the steam source by comparing the measured collection time and the expected collection time.

8. An apparatus according to claim 7 wherein the condensate sensing device includes a timer for measuring the collection time taken to collect the fixed amount of condensate, wherein the condensate sensing device is configured to start the timer when a first amount of condensate is collected and to stop the timer when a second amount of condensate is collected, wherein the difference between the first and second amounts of condensate corresponds to the fixed amount of condensate.

9. An apparatus according to claim 1 wherein the condensate sensing device is configured to:
measure a collected amount of condensate produced from the steam from the steam source over a fixed time period;
use the obtained mass flow rate to determine an expected collected amount of condensate produced from steam of a known dryness level over the same fixed time period, or use the obtained mass flow rate to determine an expected collected amount of steam from the steam source based on a known dryness level over the same fixed time period;
determine a dryness level of the steam from the steam source by comparing the measured collected amount and the expected collected amount.

10. An apparatus according to claim 1 wherein the condensate sensing device is configured to:
measure a rate of collecting condensate produced from the steam from the steam source;
use the obtained mass flow rate to determine an expected rate of collecting condensate produced from steam of a known dryness level, or use the obtained mass flow rate to determine an expected rate of collecting steam from the steam source based on a known dryness level;
determine a dryness level of the steam from the steam source by comparing the measured rate of collecting and the expected rate of collecting.

11. An apparatus according to claim 1 wherein the condensate sensing device is configured to measure a collected volume of condensate produced from the steam from the steam source.

12. An apparatus according to claim 1 wherein the condensate sensing device is configured to measure a collected mass of condensate produced from the steam from the steam source.

13. An apparatus according to claim 1 wherein the condensate sensing device includes a liquid flow meter configured to, in use, collect the condensate and measure a flow rate of the collected condensate.

14. An apparatus according to claim 1 wherein the condensate sensing device includes a vessel configured to, in use, collect the condensate.

15. An apparatus according to claim 14 including a valve controllable to selectively drain condensate from the vessel.

16. An apparatus according to claim 1 including a non-condensable gas sensing device for monitoring a flow of condensate from the condenser, wherein the non-condensable gas sensing device is configured to detect the presence of a non-condensable gas bubble in the flow of condensate from the condenser, wherein the non-condensable gas sensing device is configured to use the obtained mass flow rate in combination with the detection of the presence of the non-condensable gas bubble in the flow of condensate from the condenser so as to determine an amount of non-condensable gas in the steam from the steam source.

17. An apparatus according to claim 16 wherein the non-condensable gas sensing device includes a timer, wherein the non-condensable gas sensing device is configured to start the timer when the presence of the non-condensable gas bubble is first detected and to stop the timer when the presence of the non-condensable gas bubble is no longer detected, wherein the non-condensable gas sensing device is configured to use the obtained mass flow rate in combination with a time duration of detection of the presence of the non-condensable gas bubble in the flow of condensate from the condenser so as to determine an amount of non-condensable gas in the steam from the steam source.

18. An apparatus according to claim 1 including a temperature sensor for measuring the temperature of the steam from the steam source, and wherein the temperature sensor is configured to use the measured temperature to determine a superheat value of the steam and to determine a dryness level of the steam.

19. An apparatus according to claim 1 including an indication device configured to provide an indicator when the determined dryness level of the steam from the steam source is identified as exceeding a predefined dryness threshold.

20. A method of determining a dryness level of steam from a steam source, the method comprising the steps of:

measuring a flow of the steam from the steam source;

producing condensate from the steam from the steam source;

measuring a collection value of condensate produced from the steam from the steam source;

obtaining a mass flow rate from the measured flow of the steam from the steam source;

using the obtained mass flow rate to determine an expected collection value of condensate produced from steam of a known dryness level, or using the obtained mass flow rate to determine an expected collection value of steam from the steam source based on a known dryness level; and determining a dryness level of the steam from the steam source by comparing a difference between the measured collection value based on the actual measured steam and the expected collection value based on the steam of a known dryness level and thereby determining how much suspended water particles by mass was present in the steam, wherein the measured and expected collection values are the same type of value.

* * * * *